United States Patent
Redford

(10) Patent No.: US 10,021,897 B2
(45) Date of Patent: Jul. 17, 2018

(54) PROTEIN FEED COMPOSITIONS AND METHODS OF MAKING SAME

(71) Applicant: POET Research, Inc., Sioux Falls, SD (US)

(72) Inventor: Steven G Redford, Brandon, SD (US)

(73) Assignee: POET Research, Inc., Sioux Falls, SD (US)

( * ) Notice: Subject to any disclaimer, the term of this patent is extended or adjusted under 35 U.S.C. 154(b) by 454 days.

(21) Appl. No.: 14/599,391

(22) Filed: Jan. 16, 2015

(65) Prior Publication Data

US 2015/0181912 A1    Jul. 2, 2015

Related U.S. Application Data

(63) Continuation of application No. PCT/US2013/049491, filed on Jul. 6, 2013.

(60) Provisional application No. 61/672,630, filed on Jul. 17, 2012.

(51) Int. Cl.
| | |
|---|---|
| A23J 1/12 | (2006.01) |
| A23K 1/16 | (2006.01) |
| C12F 3/10 | (2006.01) |
| A23K 40/00 | (2016.01) |
| A23K 10/38 | (2016.01) |
| A23K 20/147 | (2016.01) |

(52) U.S. Cl.
CPC .............. *A23K 1/1631* (2013.01); *A23J 1/12* (2013.01); *A23K 10/38* (2016.05); *A23K 20/147* (2016.05); *A23K 40/00* (2016.05); *C12F 3/10* (2013.01); *Y02P 60/873* (2015.11)

(58) Field of Classification Search
CPC ... C12F 3/00; A23J 1/12; A23K 10/38; A23K 20/147; A23K 40/00
USPC .......................................... 426/11, 425, 656
See application file for complete search history.

(56) References Cited

U.S. PATENT DOCUMENTS

| | | |
|---|---|---|
| 7,935,370 B1 | 5/2011 | Prevost |
| 2010/0159071 A1 | 6/2010 | Redford |
| 2012/0064213 A1 | 3/2012 | Lee |

FOREIGN PATENT DOCUMENTS

| | | |
|---|---|---|
| WO | 2010/109203 A1 | 9/2010 |
| WO | 2011/094614 A1 | 8/2011 |

OTHER PUBLICATIONS

International Search Report for PCT/US2013/049491.

*Primary Examiner* — Vera Stulii
(74) *Attorney, Agent, or Firm* — Kagan Binder, PLLC

(57) ABSTRACT

Protein feed compositions and methods of making the protein feed compositions are disclosed herein. The protein feed compositions may comprise zein and are derived from a starch-based feedstock-to-ethanol fermentation conversion process such as a corn-to-ethanol conversion process. Methods of making the compositions include performing a starch-based feedstock-to-ethanol fermentation process in a manner that reduces the total heat exposure of the components of the protein composition as compared to a similar process which uses a cooking process to saccharify starch and/or a distillation process to separate the fermentation beer into ethanol and whole stillage. The process may include centrifugation of the fermentation beer resulting in a bulk solids mixture, extraction of a protein composition from the resulting bulk solids mixture, and desolventizing the extracted protein composition.

13 Claims, 1 Drawing Sheet

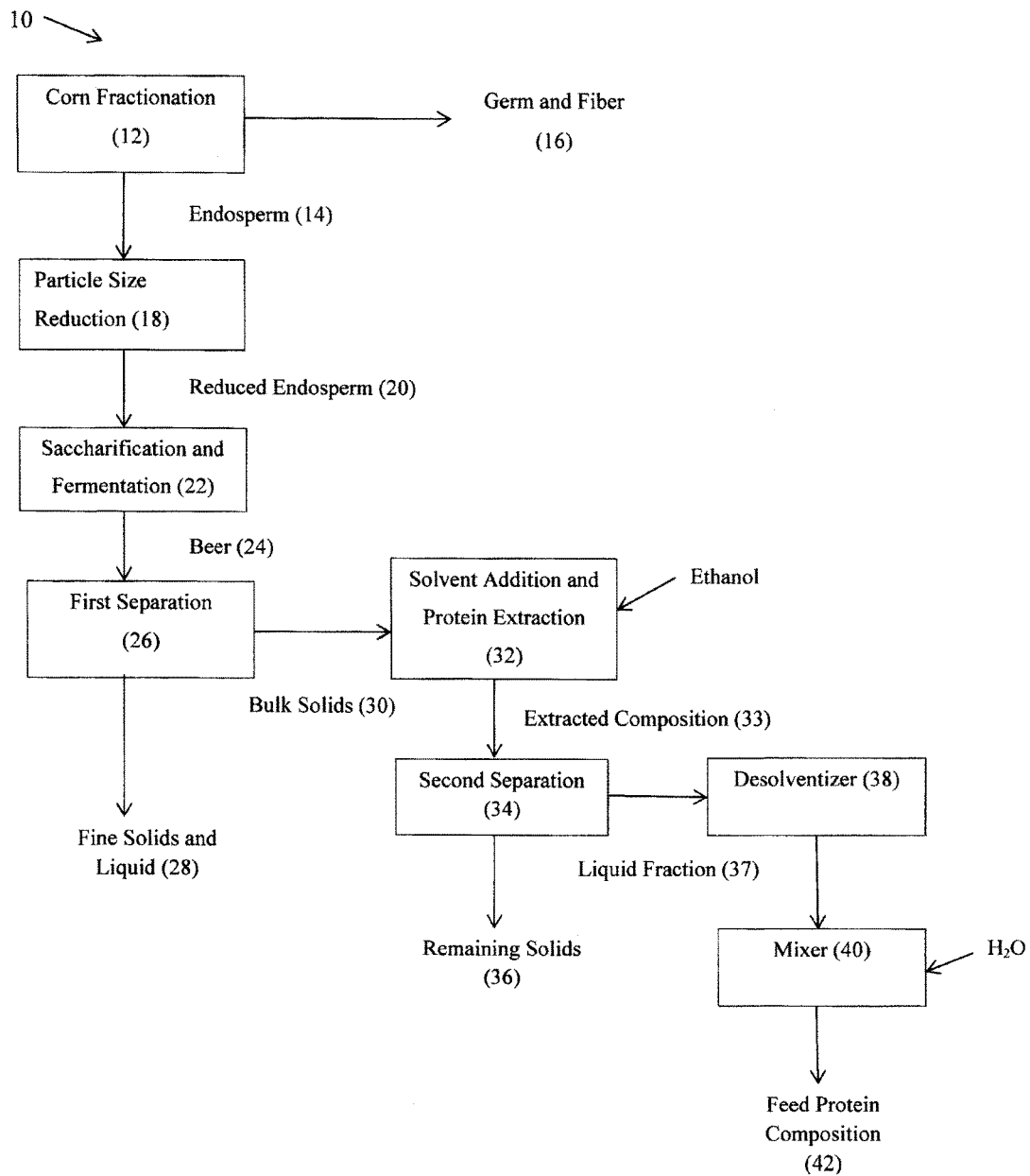

PROTEIN FEED COMPOSITIONS AND METHODS OF MAKING SAME

CROSS-REFERENCE TO RELATED APPLICATIONS

This application is a continuation of International Application No. PCT/US13/49491, entitled "PROTEIN FEED COMPOSITIONS AND METHODS OF MAKING SAME," filed Jul. 6, 2013, which claims the benefit of priority to U.S. Provisional Patent Application No. 61/672,630, entitled, "PROTEIN FEED COMPOSITIONS AND METHODS OF MAKING SAME," filed Jul. 17, 2012. The aforementioned PCT Application and U.S. Provisional Application are both incorporated herein by reference in their entirety.

BACKGROUND

Dried distillers grains ("DDG") are a co-product of the corn-to-ethanol conversion process. DDG may be produced by drying whole stillage separated from the fermentation beer, which is produced during the corn-to-ethanol conversion process. According to typical processes, wherein corn starch is hydrolyzed using a cooking process resulting in sugar and fermentation beer is subject to a distillation process resulting in ethanol and whole stillage, components of the DDG are exposed to high temperatures (i.e., close to or above the boiling point of water) in both the cooking process and the distillation process.

SUMMARY

The present disclosure relates to protein feed compositions, such as protein feed compositions comprising zein, which may be derived from feedstock-to-ethanol fermentation process, such as corn-to-ethanol fermentation processes. The present disclosure also relates to methods of making such compositions, such as methods including a feedstock-to-ethanol fermentation process using a centrifugation and extraction process to separate components post-fermentation.

In embodiments according to this disclosure, the protein feed compositions are derived from corn and comprise a significant portion of zein protein. In embodiments according to this disclosure, the feed compositions are produced from a starch-to-ethanol fermentation-based conversion process comprising a saccharification process that is conducted without cooking (i.e., a cold cook saccharification process that maintains the temperature below the starch gelatinization temperature so that saccharification occurs directly from raw native insoluble starch to soluble glucose while bypassing starch gelatinization conditions). In embodiments according to this disclosure, the feed compositions (i.e. components of the feed compositions which are derived from the fermentation beer) are separated from the fermentation beer prior to the ethanol distillation step. By using an ethanol fermentation process including a saccharification process that is conducted without cooking and by separating components of the protein feed composition which are derived from the fermentation beer prior to distillation, the resulting composition has reduced total heat exposure as compared to if it were made using a conventional process (i.e. using an equivalent process except that saccharification step is a cooking process and the fermentation beer composition initially undergoes a distillation step). By reducing the total heat exposure as compared to conventional processes, the protein feed compositions according to this disclosure may have properties different from compositions produced according to conventional processes; for example, compositions according to this disclosure may have a higher protein content (e.g., greater than about 40% protein) as compared to compositions produced by conventional processes.

In embodiments of the invention, the protein feed composition can be prepared by a method comprising the steps of: (a) fractionating corn to separate an endosperm fraction; (b) subjecting the endosperm fraction to a particle size reduction process to form reduced endosperm; (c) saccharifying the reduced endosperm using an enzyme composition to form one or more sugars; (d) fermenting the one or more sugars using a yeast to form a beer composition comprising: a liquid fraction comprising ethanol and water, and a solid fraction comprising yeast and distillers grain; wherein the saccharification and fermentation are conducted without cooking; (e) separating the beer composition to separate it into a first composition comprising bulk solids and residual liquid fraction, and a second composition comprising fine solids and a major portion of the liquid fraction; (f) extracting protein comprising zein from the first composition (bulk solids) by adding ethanol to the first composition and allowing the protein to be extracted into the ethanol; (g) separating the extracted composition of step (f) to form a third composition comprising a majority of solids along with residual liquid fraction; and a fourth composition comprising a majority of liquid fraction along with residual solids; (g) at least partially de-solventizing the fourth composition to form a protein feed composition comprising zein and having a low total heat exposure; and (h) optionally, adding water to the protein feed composition.

In embodiments according to the disclosure, the feed compositions comprise, on a dry weight basis, about 75% weight or greater crude protein; about 10% weight or less crude fat, about 20% weight or less neutral detergent fiber, about 1% weight or less residual starch, and about 1% weight or less sugars. In other embodiments, the protein feed composition comprise about 78% to about 91% weight crude protein; about 1% weight to about 12% weight crude fat, about 3% weight or less ash, about 8% to about 15% 20% weight neutral detergent fiber, about 1% weight or less residual starch, and about 1% weight or less sugars.

In embodiments according to this disclosure, the processes involve: separating a starch-based feedstock fermentation beer composition comprising a solids fraction and a liquids fraction into a first mixture comprising bulk solids (such as solids having an average particle size of greater than about 15 µm, or greater than about 30 µm) and a minority portion of the liquids fraction and a second mixture comprising fine solids (such as solids having an average particle size of about 15 µm or less, or of about 30 µm or less) and a majority portion of the liquids fraction; using a solvent to extract protein from the first mixture to form an extracted composition; separating the extracted composition into an extracted solids fraction and extracted liquids fraction, wherein the extracted liquids fraction comprises the extracted protein; and, at least partially de-solventizing the extracted liquids fraction to form a protein feed composition comprising the protein, wherein the process is performed in a manner that reduces the total heat exposure of the protein as compared to a process using distillation to initially separate the fermentation beer composition. In further embodiments, the extracted protein comprises zein and the protein feed compositions therefore comprise zein. In some embodiments, the process also includes saccharifying starch derived from a starch-based feedstock into sugar and fermenting the sugar into the beer composition, and the process is performed in manner that reduces the total heat exposure of the protein (such as the protein comprising zein) as compared to a similar process except in which saccharification is performed using a cooking process and separating the fermentation beer composition is initially done using a distillation process. In some embodiments, separating the beer composition and separating the extracted composition involves centrifuging (alone or in combination with another separating process). In some embodiments, the protein (such as the zein) is not exposed to temperatures greater than 190 F, greater than 180 F, greater than 120 F, or greater than 100 F. in some embodiments, the process also includes optionally pre-treating a starch-based feedstock, for example pre-treating corn, saccharifying the starch to produce sugar, fermenting the sugar to produce a beer composition comprising a solids fraction and a liquids fraction, wherein saccharifying and fermenting can occur simultaneously or stepwise. In some embodiments, the process also comprises drying the protein composition. In some embodiments, the process involves drying the protein composition and thereafter adding liquid to the resultant dried composition.

DESCRIPTION OF DRAWINGS

FIG. 1 is a flow process diagram of an embodiment of a starch-based feedstock-to-ethanol conversion process in which certain methods according to this disclosure may be implemented and certain compositions according to this disclosure may be made.

DETAILED DESCRIPTION

Definitions

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common United States patent law definition of "comprising" and is therefore interpreted to be an open term meaning "at least the following" and also interpreted not to exclude additional features, limitations, aspects, etc.

The term "about" is meant to account for variations due to experimental error or to permit deviations from the measurements that don't negatively impact the intended purpose. The term "substantially" is meant to permit deviations from the descriptive term that don't negatively impact the intended purpose. All measurements or numbers are implicitly understood to be modified by the word about, even if the measurement or number is not explicitly modified by the word about. All descriptive terms are implicitly understood to be modified by the word substantially, even if the descriptive term is not explicitly modified by the word substantially. For example, the phrase "wherein the protein composition is substantially made by a process wherein the zein is exposed to temperatures no greater than about 190 F" is intended to encompass processes wherein the zein may be temporarily exposed to temperatures greater than 190 F (but for example not as long as such zein would be exposed to these temperatures according to a process for producing a protein composition employing a saccharification process using cooking and/or a distillation process) potentially as a means to avoid the claim limitations but without meaningful impact to the resulting protein composition (for example the resulting protein composition still has different properties than if it were made using the cooking and/or distillation process).

Where ever the terms "a" or "an" are used, "one or more" is understood, unless explicitly stated otherwise or such interpretation is nonsensical in context.

Corn Fractionation

Referring to FIG. 1, in the first step of the process 10, a starch-based feedstock such as corn is sent to a fractionation process 12. In the fractionation process 12, the corn is separated into an endosperm fraction 14 and a germ/fiber fraction 16. Fractionation may be accomplished by any of a variety of methods and apparatus, such as those disclosed in U.S. Patent Application Publication No. 2004/0043117, the disclosure of which is incorporated herein by reference. Examples of suitable methods and apparatus for fractionation include a sieve, sieving, and elutriation. Further examples of suitable apparatus include a frictional mill such as a rice or grain polishing mill (e.g., those manufactured by Satake, Kett, or Rapsco). As used herein, the phrase "fractionated corn" refers to corn that includes only a portion or fraction of the total plant material, typically a material including starch.

Once fractionated the particle size of the separated endosperm 14 can be reduced by a variety of methods (e.g., by grinding to make the starch available for saccharification and fermentation). Other methods of endosperm reduction are available. For example, the endosperm can be ground with a ball mill, a roller mill, a hammer mill, or another mill known for grinding vegetable material, and/or other materials for the purposes of particle size reduction. The use of emulsion technology, rotary pulsation, and other means of particle size reduction can be employed to increase surface area of plant material (e.g., fractionated plant material) while raising the effectiveness of flowing the liquefied media. The prepared plant material (e.g., fractionated plant material) can be referred to as being or including "raw starch".

As is known to one of skill in the art, a fine grind exposes more surface area of the endosperm, and can facilitate saccharification and fermentation. In an embodiment, the endosperm is ground so that a substantial portion (e.g., a majority of the ground endosperm) has a particle size of about 500 µm or less.

Saccharification/Fermentation

After fractionation and particle size reduction, the reduced endosperm 20 is sent to a simultaneous saccharification and fermentation process 22 where the reduced endosperm 20 is converted into ethanol.

The saccharification process includes converting the fractionated corn endosperm to sugars that can then be fermented by a microorganism such as yeast to produce ethanol. This conversion can be effected by saccharifying the fractionated corn endosperm with any of a variety of known saccharifying enzyme compositions. In an embodiment, the saccharifying enzyme composition includes an amylase, such as an alpha amylase (e.g., an acid fungal amylase). In some embodiments, the enzyme composition also includes a glucoamylase.

In embodiments of the invention, saccharification is conducted without cooking. As used herein the term "without cooking" means maintaining a temperature below starch gelatinization temperature so that saccharification occurs directly from raw native insoluble starch to soluble glucose while bypassing starch gelatinization conditions. For example, saccharification can be conducted by mixing source of saccharifying enzyme composition, yeast, and fermentation ingredients with reduced corn endosperm and process waters without cooking.

As mentioned, the present process can include simultaneously converting reduced corn endosperm to sugars and fermenting those sugars with a microorganism such as yeast. Simultaneous saccharifying and fermenting can be conducted using the reagents and conditions described above for saccharifying and fermenting.

In certain embodiments, the present process can employ a glucoamylase. Glucoamylase is also known as amyloglucosidase and has the systematic name 1,4-alpha-D-glucan glucohydrolase (E.C. 3.2.1.3). Glucoamylase refers to an enzyme that removes successive glucose units from the non-reducing ends of starch. For example, certain glucoamylases can hydrolyze both the linear and branched glucosidic linkages of starch, amylose, and amylopectin. A variety of suitable glucoamylases are known and commercially available. For example, suppliers such as Novozymes and Genencor provide glucoamylases. The glucoamylase can be of fungal origin.

The amount of glucoamylase employed in the present process can vary according to the enzymatic activity of the amylase preparation.

In certain embodiments, the present process employs an alpha-amylase. The alpha-amylase can be one produced by fungi. The alpha-amylase can be one characterized by its ability to hydrolyze carbohydrates under acidic conditions. An amylase produced by fungi and able to hydrolyze carbohydrates under acidic conditions is referred to herein as acid fungal amylase, and is also known as an acid stable fungal alpha-amylase. Acid fungal amylase can catalyze the hydrolysis of partially hydrolyzed starch and large oligosaccharides to sugars such as glucose. The acid fungal amylase that can be employed in the present process can be characterized by its ability to aid the hydrolysis of raw or native starch, enhancing the saccharification provided by glucoamylase. In an embodiment, the acid fungal amylase produces more maltose than conventional (e.g., bacterial) alpha-amylases.

Examples of suitable acid fungal amylase can be isolated from any of a variety of fungal species, including *Aspergillus, Rhizopus, Mucor, Candida, Coriolus, Endothia, Enthomophtora, Irpex, Penicillium, Sclerotium* and *Torulopsis* species. In an embodiment, the acid fungal amylase is thermally stable and is isolated from *Aspergillus* species, such as *A. niger, A. saitoi* or *A. oryzae*, from *Mucor* species such as *M. pusillus* or *M. miehei*, or from *Endothia* species such as *E. parasitica*. In an embodiment, the acid fungal amylase is isolated from *Aspergillus niger*. The acid fungal amylase activity can be supplied as an activity in a glucoamylase preparation, or it can be added as a separate enzyme. A suitable acid fungal amylase can be obtained from Novozymes, for example in combination with glucoamylase.

The amount of acid fungal amylase employed in the present process can vary according to the enzymatic activity of the amylase preparation.

Examples of suitable liquids include water and a mixture of water and process waters, such as stillage (backset), scrubber water, evaporator condensate or distillate, side stripper water from distillation, or other ethanol plant process waters. In an embodiment, the liquid includes water. In an embodiment, the liquid includes water in a mixture with about 1 to about 70 vol-% stillage, about 15 to about 60 vol-% stillage, about 30 to about 50 vol-% stillage, or about 40 vol-% stillage.

Any of a variety of yeasts can be employed as the yeast starter in the present process. Examples of suitable yeasts include any of a variety of commercially available yeasts, such as commercial strains of *Saccharomyces cerevisiae*. Examples of suitable strains include "Fali" (Fleischmann's), Thermosac (Alltech), Ethanol Red (LeSafre), BioFerm AFT (North American Bioproducts), and the like. In an embodiment, the yeast is selected to provide rapid growth and fermentation rates in the presence of high temperature and high ethanol levels. In an embodiment, Fali yeast has been found to provide good performance as measured by final alcohol content of greater than 17% by volume. The amount of yeast starter employed is selected to effectively produce a commercially significant quantity of ethanol in a suitable time (e.g., less than 75 hours).

In an embodiment, simultaneous saccharification and fermentation is conducted at a temperature of about 25 to about 40 C or about 30 C to about 35 C. In an embodiment, during saccharification and fermentation the temperature is decreased from about 40 C to about 25 C or from about 35 C to about 30 C during the first half of the saccharification, and the temperature is held at the lower temperature for the second half of the saccharification.

In an embodiment, saccharification and fermentation is conducted at a pH of about 6 or less, a pH of about 3 to about 6, about 3.5 to about 6, about 4 to about 5, about 4 to about 4.5, about 4.5 to about 5, or about 4.5 to about 4.8. The initial pH of the saccharification and fermentation mixture can be adjusted by addition of, for example, ammonia, sulfuric acid, phosphoric acid, process waters (e.g., stillage (backset), evaporator condensate (distillate), side stripper bottoms, and the like), and the like.

In an embodiment, saccharification and fermentation are conducted for about to 25 (e.g., 24) to about to 150 hours, about 25 (e.g., 24) to about 72 hours, about 45 to about 55 hours, about 50 (e.g., 48) to about 96 hours, about 50 to about 75 hours, or about 60 to about 70 hours. For example, saccharification and fermentation can be conducted for about 30, about 40, about 50, about 60, or about 70 hours. For example, saccharification and fermentation can be conducted for about 35, about 45, about 55, about 65, or about 75 hours.

In an embodiment, simultaneous saccharifying and fermenting can be carried out employing quantities of enzyme and yeast selected to maintain high concentrations of yeast and high levels of budding of the yeast in the fermentation broth. For example, the present process can employ quantities of enzyme and yeast selected to maintain yeast at or above about 200 cells/mL, at or above about 300 cells/mL, or at about 300 to about 600 cells/mL.

In an embodiment, simultaneous saccharifying and fermenting can be carried out employing quantities of enzyme and yeast selected to maintain low concentrations of soluble sugar in the fermentation broth. In an embodiment, simultaneous saccharifying and fermenting can be carried out employing quantities of enzyme and yeast selected to maintain low concentrations of glucose in the fermentation broth. For example, the present process can employ quantities of enzyme and yeast selected to maintain glucose at levels at or below about 2 wt-%, at or below about 1 wt-%, at or below about 0.5 wt-%, or at or below about 0.1 wt-%. For example, the present process can employ quantities of enzyme and yeast selected to maintain glucose at levels at or below about 2 wt-% during saccharifying and fermenting. For example, the present process can employ quantities of enzyme and yeast selected to maintain glucose at levels at or below about 2 wt-% from hours 0-10 (or from 0 to about 15% of the time) of saccharifying and fermenting. For example, the present process can employ quantities of enzyme and yeast selected to maintain glucose at levels at or below about 1 wt-%, at or below about 0.5 wt-%, or at or below about 0.1 wt-% from hours 12-54 (or from about 15% to about 80% of the time) of saccharifying and fermenting. For example, the present process can employ quantities of enzyme and yeast selected to maintain glucose at levels at or below about 1 wt-% from hours 54-66 (or about from 80% to about 100% of the time) of saccharifying and fermenting.

Production of Protein Compositions

After saccharification/fermentation 22, components of the protein composition, which are derived from the resulting beer 24 are separated from the beer 24 in a manner that reduces the heat exposure of the components as compared to using the traditional distillation process to separate beer components (initially into ethanol and whole stillage). In some embodiments, the post-fermentation separation process is a multi-step separation process, comprising a first separation, an extraction and a second separation, for example as described below.

First Separation

After the saccharification and fermentation process 22, the resulting beer 24 is sent to a first separation process 26. The first separation process 26 is configured to at least partially separate the bulk solids 30 from the fine solids and liquids 28. In an embodiment of the invention, the first separation process 26 is conducted using a centrifuge, for example, a decanter centrifuge. A representative decanter centrifuge is commercially available under the trade designation "CB501" from Westfalia (Northvale, N.J.). In the decanter centrifuge, the beer 24 is separated into a bulk solids stream 30 and a fine solids/liquid stream 28. The solids present in the fine solids stream 28 comprise predominately yeast and unfermented corn endosperm particles. The liquid in the fine solids stream 28 comprises ethanol, water, and may further include corn oil. Soluble species may also be present. The bulk solids stream 30 comprises the residual components of the corn fraction after the bulk of the starch has been converted to ethanol. This residual mater is comprised of any residual starch, fiber, proteins, xanthophylls, or other similar corn components.

In some embodiments, the centrifuge is adjusted so that the fine solids in fine solids stream 28 have an average particle size of about 30 µm or less, and the bulk solids in the bulk solids stream 30 have an average particle size of greater than about 30 µm. In other embodiments, the centrifuge is adjusted so that the fine solids in the fine solids stream 28 have an average particle size of about 10 µm or less, and the bulk solids in the bulk solids stream 30 have an average particle size of greater than about 10 µm. The separation may be controlled, for example, by known techniques for controlling the speed of the centrifuge and/or the flow rate of material entering passing through the centrifuge.

Solvent Extraction

After separation, the bulk solid stream 30 is sent to a solvent extraction process 32. In the solvent extraction process 32, ethanol is used as a solvent in order to extract protein (e.g., zein protein) from the bulk solids 30 into the ethanol phase to form extracted composition 33. The extraction process 32 is typically conducted in a stirred tank reactor. In some embodiments of the extraction process 32, the bulk solids stream 30 is diluted to about 50% by volume with ethanol, and the contents of the extraction vessel are heated to about 120° F. and held for about 20 minutes in order to solubilize the zein protein so that it is extracted into the liquid (i.e., ethanol) phase.

Second Separation Process

After the extraction process 32, the extracted composition 33 is then fed to a second separation step 34. In the second separation step 34, the extracted composition 33 is separated into a solids stream 36 and a liquid stream 37. The solids stream 37 comprises the solids remaining after the solvent extraction process 32 along with some residual liquid phase. The liquid stream 37 comprises predominately ethanol with dissolved protein (zein) solids and some residual solids phase. In an embodiment of the invention, the second separation step 34 is conducted using a decanter centrifuge. One useful decanter centrifuge is commercially available under the trade designation "CB505" from Westfalia (Northvale, N.J.). The decanter centrifuge can be adjusted, as known to one of skill in the art, in order to separate the liquid stream 36 from the solids stream 36.

The operation of the decanter centrifuge can be controlled in order to control the protein concentration in the resulting protein feed composition. For example, as the purity of the liquid stream 37 increases (i.e., reduced residual solids), the protein concentration of the resulting protein feed composition also increases.

Desolventization

After the second separation step 34, the liquid fraction 37 is then sent to a desolventizer 38 (e.g., a double drum vacuum dryer) where the solvent (predominately ethanol) is removed. Typically, the solvent is removed in order to form a dry protein product having about 0.5% weight or less moisture. Optionally, a mixer 40 can be used in order to water to the dried protein product in order to form a protein feed composition having a desired amount of water. Typically, the amount of water ranges from about 1% to about 12% weight.

Protein Feed Compositions

As discussed herein, in some embodiments, the protein feed compositions according to this disclosure are produced using a feedstock-to-ethanol fermentation process wherein the total heat exposure of the protein is reduced as compared to a similar process for producing protein feed compositions, except in which distillation is used to initially separate the beer fermentation components (i.e. in which distillation is used to initially separate ethanol from whole stillage in the beer composition). In other embodiments, the protein feed compositions according to this disclosure are produced using a feedstock-to-ethanol fermentation process wherein the total heat exposure of the protein is reduced as compared to a similar process for producing protein feed compositions, except in which saccharification is performed using a cooking process. In yet other embodiments, the protein feed compositions according to this disclosure are produced according to a feedstock-to-ethanol fermentation process wherein the total heat exposure of the protein is reduced as compared to a similar process for producing protein feed compositions, except in which saccharification is performed using a cooking process and distillation is initially used to separate the beer fermentation components. As discussed herein, in some embodiments, protein feed compositions according to the disclosure are produced using a process that limits total exposure to heat. For example, in some embodiments, the endosperm is not cooked to convert the starch into sugars and the feed paste composition is separated without passing through a distillation process.

In embodiments according to this disclosure, the protein feed composition comprises, on a dry weight basis, about 75% weight or greater crude protein; about 10% weight or less crude fat, about 3% weight or less ash, about 20% weight or less neutral detergent fiber, about 1% weight or less residual starch, and about 1% weight or less sugars.

In other embodiments according to this disclosure, the protein feed composition comprises, on a dry weight basis, about 95% weight or greater crude protein; about 10% weight or less crude fat, about 3% weight or less ash, about 20% weight or less neutral detergent fiber, about 1% weight or less residual starch, and about 1% weight or less sugars.

In yet other embodiments according to this disclosure, the protein feed compositions comprises, on a dry weight basis, about 78% to about 91% weight crude protein; about 1% weight to about 12% weight crude fat, about 3% weight or less ash, about 8% to about 15% 20% weight neutral detergent fiber, about 1% weight or less residual starch, and about 1% weight or less sugars. Because they are derived from corn, in some embodiments, the protein feed compositions of the invention comprise a major portion of zein as the protein.

ADDITIONAL EMBODIMENTS

1. A method of making a protein feed composition having a low heat exposure, the method comprising the steps of:
   (a) fractionating corn to separate an endosperm fraction;
   (b) subjecting the endosperm fraction to a particle size reduction process to form reduced endosperm;
   (c) saccharifying the reduced endosperm using an enzyme composition to form one or more sugars;
   (d) fermenting the one or more sugars using a yeast to form a beer composition comprising: a liquid fraction comprising ethanol and water, and a solid fraction comprising yeast and distillers grain; wherein the saccharification and fermentation are conducted without cooking;
   (e) separating the beer composition to separate it into a first composition comprising bulk solids and residual liquid fraction, and a second composition comprising fine solids and a major portion of the liquid fraction;
   (f) extracting protein comprising zein from the first composition by adding ethanol to the first composition and allowing the protein to be extracted into the ethanol;
   (g) separating the composition of step (f) to form a third composition comprising a majority of solids along with residual liquid fraction; and a fourth composition comprising a majority of liquid fraction along with residual solids;
   (h) at least partially desolventizing the fourth composition to form a protein feed composition comprising zein and having a low total heat exposure; and
   (i) optionally, adding water to the protein feed composition.

2. The method of claim 1, wherein the fine solids have an average particle size of about 30 µm or less, and the bulk solids have an average particle size of greater than about 30 µm.

3. The method of claim 1, wherein the fine solids have an average particle size of about 10 µm or less, and the bulk solids have an average particle size of greater than about 10 µm.

4. The method of claim 1, wherein the composition comprises, on a dry weight basis, about 75% weight or greater crude protein; about 10% weight or less crude fat, about 20% weight or less neutral detergent fiber, about 1% weight or less residual starch, and about 1% weight or less sugars.

5. The method of claim 1, wherein the composition comprises, on a dry weight basis, about 95% weight or greater crude protein; about 10% weight or less crude fat, about 20% weight or less neutral detergent fiber, about 1% weight or less residual starch, and about 1% weight or less sugars.

6. The method of claim 1, wherein the composition comprises, on a dry weight basis, about 78% to about 91% weight crude protein; about 1% weight to about 12% weight crude fat, about 3% weight or less ash, about 8% to about 20% weight neutral detergent fiber, about 1% weight or less residual starch, and about 1% weight or less sugars.

7. The method of claim 1, wherein the enzyme composition comprises one or more of a glucoamylase, an alpha-amylase, or mixtures thereof.

8. The method of claim 1, wherein the saccharification and fermentation are conducted without cooking at a temperature of about 100° F. or less.

9. The method of claim 1, wherein the protein comprises zein.

10. A protein feed composition having a low heat exposure comprising, on a dry weight basis, about 75% weight or greater crude protein; about 10% weight or less crude fat, about 3% weight or less ash, about 20% weight or less neutral detergent fiber, about 1% weight or less residual starch, and about 1% weight or less sugars.

11. A protein feed composition having a low heat exposure comprising, on a dry weight basis, about 95% weight or greater crude protein; about 10% weight or less crude fat, about 20% weight or less neutral detergent fiber, about 1% weight or less residual starch, and about 1% weight or less sugars.

12. A protein feed composition having a low heat exposure comprising, on a dry weight basis about 78% to about 91% weight crude protein; about 1% weight to about 12% weight crude fat, about 8% to about 15% weight neutral detergent fiber, about 1% weight or less residual starch, and about 1% weight or less sugars.

13. The protein feed composition of any of claims 10-12, wherein the protein comprises zein.

14. The protein feed composition of any of claims 10-12, wherein the protein feed composition comprises about 3% weight or less ash.

15. A process, comprising:
   a. separating a fermentation beer composition comprising a solids fraction and a liquids fraction into a first mixture comprising bulk solids and a minority portion of the liquids and a second mixture comprising fine solids and a majority portion of the liquids fraction;
   b. using a solvent to extract a protein from the first mixture to form an extracted composition;
   c. separating the extracted composition into an extracted solids fraction and an extracted liquids fraction, wherein the extracted liquids composition comprises the protein; and,
   d. at least partially de-solventizing the extracted liquids composition to form a protein feed composition comprising the protein, wherein the process is performed in a manner that reduces the total heat exposure of the protein as compared to a process using distillation to initially separate the fermentation beer composition into ethanol and whole stillage.

16. A process according to embodiment 15, wherein the protein is at least a zein, 17. A process according to embodiment 15 or 16, further comprising saccharifying starch derived from a starch-based feedstock into sugar and fermenting the sugar into a beer composition.

18. A process according to embodiment 17, wherein the process is performed in a manner that reduces the total heat exposure of the protein as compared to a process wherein saccharifying is done using a cooking process and a distillation is used to initially separate the beer composition into ethanol and whole stillage.

19. A process according to any of embodiments 15-18, wherein separating the beer composition comprises centrifuging.

20. A process according to any of embodiments 15-19, wherein separating the extracted composition comprises centrifuging.

21. A process according to any of embodiments 15-20, further comprising adding liquid to the protein feed composition.

22. A process according to any of embodiments 15-21, wherein the fine solids have an average particle size of about 30 μm or less, and the bulk solids have an average particle size of greater than about 30 μm.

23. A process according to any of embodiments 15-21, wherein the fine solids have an average particle size of about 15 μm or less, and the bulk solids have an average particle size of greater than about 15 μm.

24. A process according to any of embodiments 15-21, wherein the fine solids have an average particle size of about 10 μm or less, and the bulk solids have an average particle size of greater than about 10 μm.

25. A process according to any of embodiments 15-24, wherein the composition comprises, on a dry weight basis:
  a. about 75% weight or greater crude protein;
  b. about 10% weight or less crude fat;
  c. about 20% weight or less neutral detergent fiber;
  d. about 1% weight or less starch; and,
  e. about 1% weight or less sugars.

26. A process according to embodiment 25, wherein the amount of crude protein is about 95% weight or greater.

27. A process according to embodiment 25, wherein the amount of crude protein ranges from about 78% to about 91%; the amount of crude fat ranges from about 1% weight to about 12%; and the composition further comprises 3% weight or less ash.

28. A process according to any of embodiments 15-27, wherein saccharifying and fermenting are conducted at temperatures of about 190° F. or less, about 180° F. or less, about 170° F. or less, about 160° F. or less, about 150° F. or less, about 140° F. or less, about 130° F. or less, about 120° F. or less, about 110° F. or less, or about 100° F. or less.

29. A protein feed composition comprising solids components separated from a fermentation beer composition, which solids components comprise, on a dry weight basis, about 75% weight or greater crude protein; about 10% weight or less crude fat, about 3% weight or less ash, about 20% weight or less neutral detergent fiber, about 1% weight or less residual starch, and about 1% weight or less sugars, wherein the solids components have a reduced heat exposure as compared to similar solids components which are separated from a fermentation beer composition initially using a distillation process to separate ethanol from whole stillage.

30. A protein feed composition according to embodiment 29, wherein the solids components have a reduced heat exposure as compared to solids components resulting from a saccharification process using cooking and are separated from the fermentation beer composition initially using distillation to separate ethanol from whole stillage.

31. A protein feed composition according to embodiment 29 or 30, wherein the amount of crude protein is at least about 95% weight.

32. A protein feed composition according to embodiment 31, wherein the amount of crude protein ranges from about 78% to about 91% weight crude protein; the amount of crude fat ranges from about 1% weight to about 12% weight; and, the amount of neutral detergent fiber ranges from about 8% to about 20%.

33. A protein feed composition according to embodiment 32, wherein the amount of neutral detergent fiber ranges from about 8% to about 15%.

34. A protein feed composition according to any of embodiments 29-33, wherein the crude protein comprises zein.

What is claimed is:

1. A process, comprising:
   a. separating a fermentation beer composition comprising a solids fraction and a liquids fraction into a first mixture comprising bulk solids and a minority portion of the liquids and a second mixture comprising fine solids and a majority portion of the liquids fraction;
   b. using a solvent to extract a protein from the first mixture to form an extracted composition;
   c. separating the extracted composition into an extracted solids fraction and an extracted liquids fraction, wherein the extracted liquids fraction comprises the protein; and,
   d. at least partially de-solventizing the extracted liquids fraction to form a protein feed composition comprising the protein, wherein the process is performed in a manner that reduces the total heat exposure of the protein as compared to a process using distillation to initially separate the fermentation beer composition into ethanol and whole stillage and that the protein is not exposed to temperatures greater than 180° F.

2. A process according to claim 1, wherein the protein is at least a zein.

3. A process according to claim 2, further comprising saccharifying starch derived from a starch-based feedstock into sugar and fermenting the sugar into the beer composition.

4. A process according to claim 3, wherein the process is performed in a manner that reduces the total heat exposure of the zein as compared to a process wherein saccharifying is done using a cooking process and a distillation is used to initially separate the beer composition into ethanol and whole stillage.

5. A process according to claim 4, wherein separating the beer composition comprises centrifuging.

6. A process according to claim 4, wherein separating the extracted composition comprises centrifuging.

7. A process according to claim 4, further comprising adding liquid to the protein feed composition.

8. A process according to claim 4, wherein the fine solids have an average particle size of about 30 μm or less, and the bulk solids have an average particle size of greater than about 30 μm.

9. A process according to claim 4, wherein the fine solids have an average particle size of about 10 μm or less, and the bulk solids have an average particle size of greater than about 10 μm.

10. A process according to claim 4, wherein the feed composition comprises, on a dry weight basis:
   a. about 75% weight or greater crude protein;
   b. about 10% weight or less crude fat;

c. about 20% weight or less neutral detergent fiber;
d. about 1% weight or less starch; and,
e. about 1% weight or less sugars.

11. A process according to claim 10, wherein the amount of crude protein is about 95% weight or greater.

12. A process according to claim 10, wherein the amount of crude protein ranges from about 78% to about 91%; the amount of crude fat ranges from about 1% weight to about 12%; and the feed composition further comprises 3% weight or less ash.

13. A process according to claim 4, wherein saccharifying and fermenting are conducted at temperatures of about 100° F. or less.

* * * * *